Figure 1:
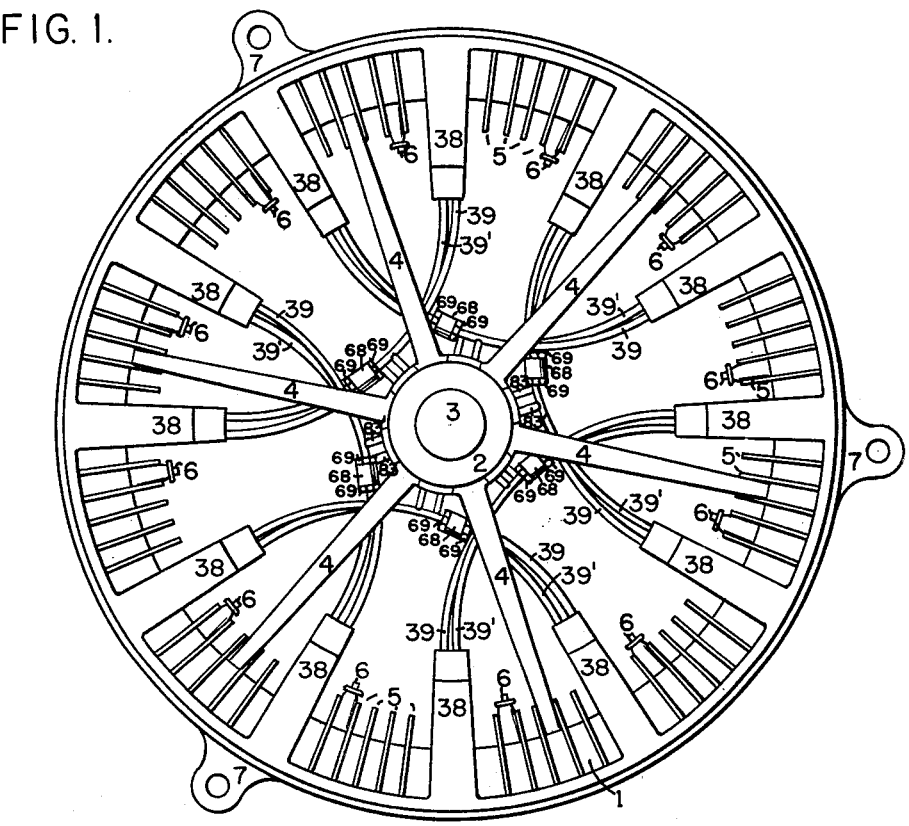

July 14, 1964   J. F. RHODES   3,140,696
ROTARY INTERNAL COMBUSTION MOTOR
Filed March 13, 1959   9 Sheets-Sheet 1

INVENTOR.
JOSEPH F. RHODES
BY Harry R. Lubcke
AGENT

July 14, 1964  J. F. RHODES  3,140,696
ROTARY INTERNAL COMBUSTION MOTOR
Filed March 13, 1959  9 Sheets-Sheet 2

INVENTOR.
JOSEPH F. RHODES
BY *Harry R. Lubeke*
AGENT

July 14, 1964  J. F. RHODES  3,140,696
ROTARY INTERNAL COMBUSTION MOTOR
Filed March 13, 1959  9 Sheets-Sheet 3
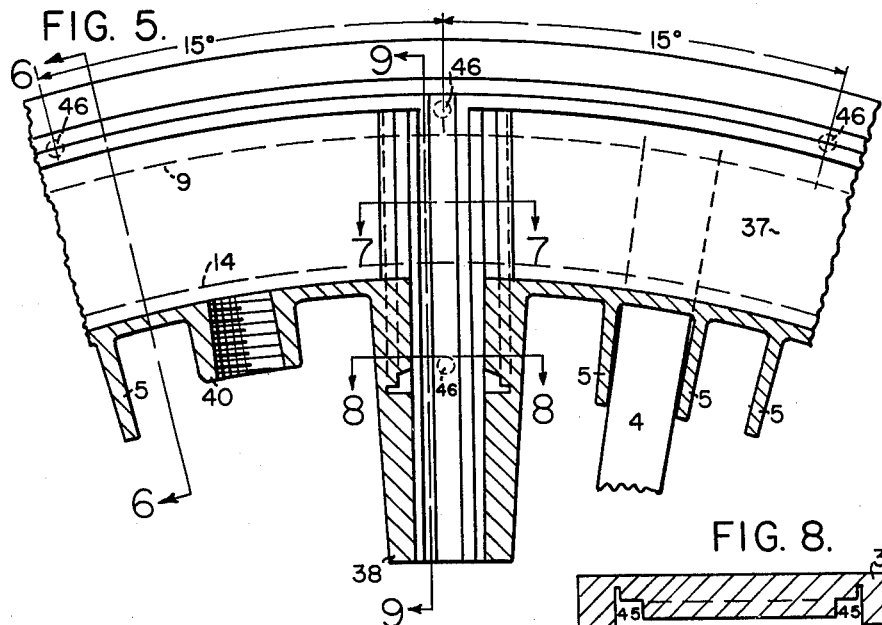
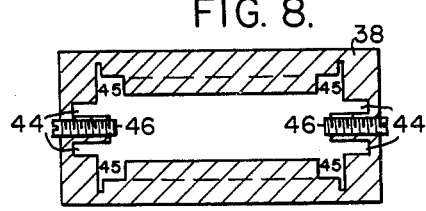
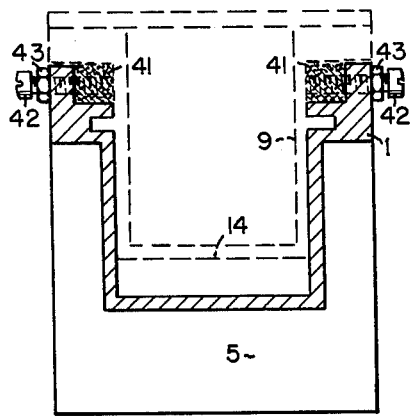
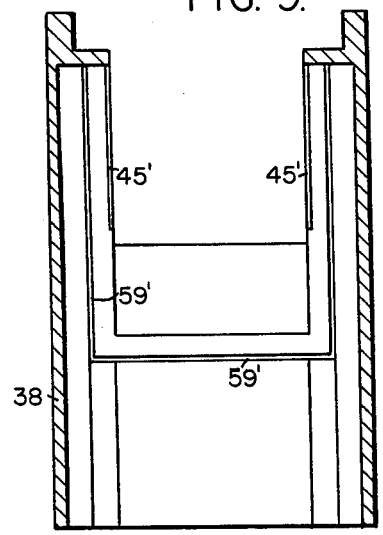
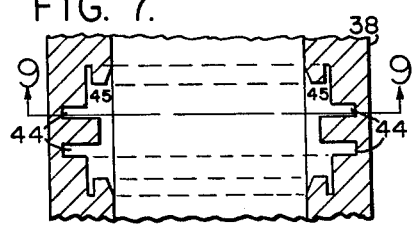
INVENTOR.
JOSEPH F. RHODES
BY *Harry R. Lubeke*
AGENT

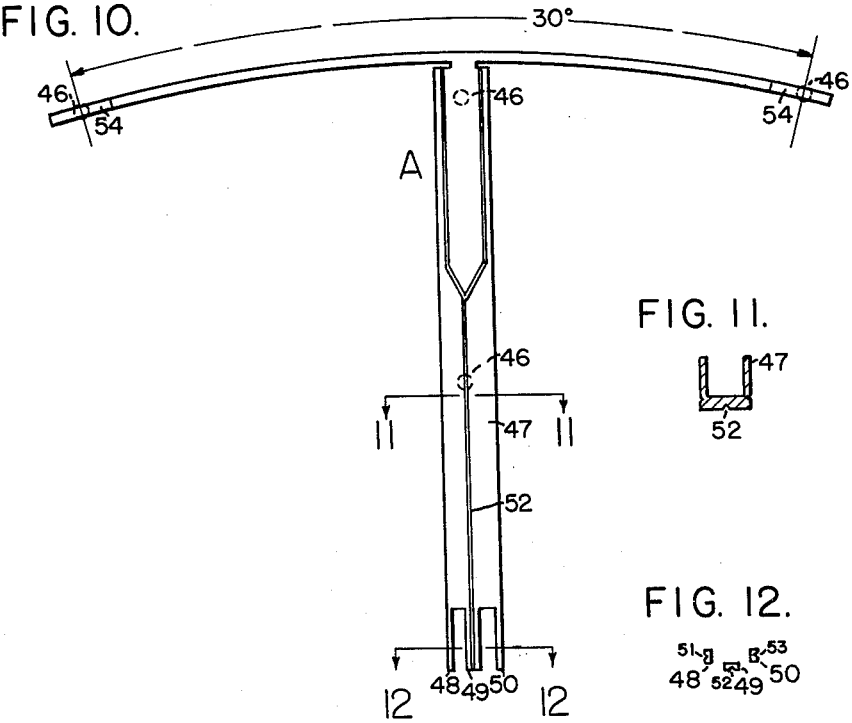
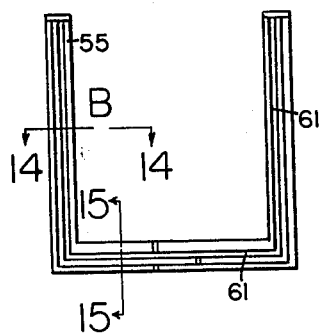
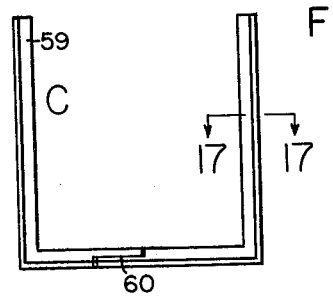
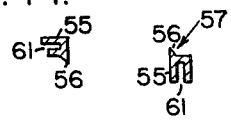

FIG. 19.
FIG. 18.
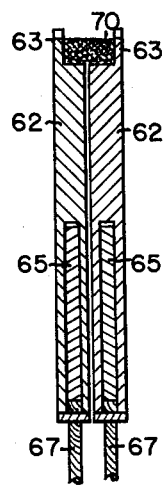
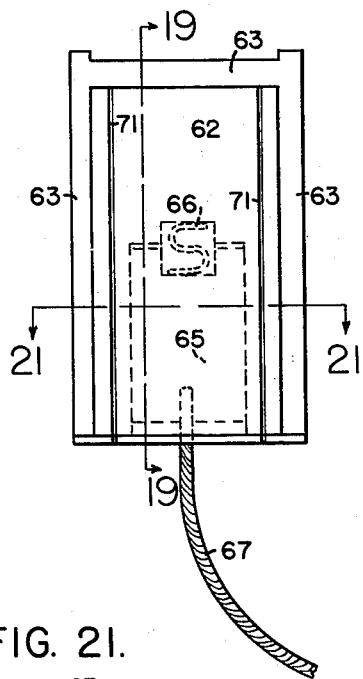
FIG. 20.   FIG. 21.
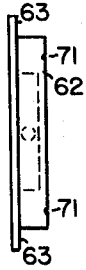
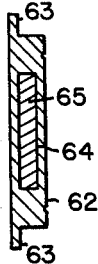
INVENTOR.
JOSEPH F. RHODES
BY Harry R. Lubcke
AGENT July 14, 1964   J. F. RHODES   3,140,696
ROTARY INTERNAL COMBUSTION MOTOR
Filed March 13, 1959   9 Sheets-Sheet 6

INVENTOR.
JOSEPH F. RHODES
BY Harry R. Lubcke
AGENT

July 14, 1964  J. F. RHODES  3,140,696
ROTARY INTERNAL COMBUSTION MOTOR
Filed March 13, 1959  9 Sheets-Sheet 7

INVENTOR.
JOSEPH F. RHODES
BY *Harry R. Lubeke*
AGENT

July 14, 1964 J. F. RHODES 3,140,696
ROTARY INTERNAL COMBUSTION MOTOR
Filed March 13, 1959 9 Sheets-Sheet 9

INVENTOR.
JOSEPH F. RHODES
BY *Harry R. Lubcke*
AGENT

United States Patent Office  3,140,696
Patented July 14, 1964

3,140,696
ROTARY INTERNAL COMBUSTION MOTOR
Joseph F. Rhodes, Los Angeles, Calif.; Baldo M. Kristovich, administrator of said Joseph F. Rhodes, deceased
Filed Mar. 13, 1959, Ser. No. 799,355
15 Claims. (Cl. 123—16)

My invention relates to rotary motors, and particularly those of the internal combustion type.

A rotary internal combustion motor has the advantages of an even flow of power, simplicity, absence of inertial forces, small size and light weight over the known reciprocating internal combustion engine.

Rotary motors are not, however, in common use. This may be because springs have heretofore been employed in or near the combustion area and rapidly become ineffective, or because a simple arrangement has not been brought forth that provides good scavenging.

I have removed these and other disadvantages of prior rotary motors by providing a cam having a working surface such that the sum of any two radii ninety degrees apart is a constant. This allows an essentially springless mechanical connection between pairs of blades (or vanes), which are characteristic of the rotary motor, and yet an excellent mechanical fit to the cam surface.

Complete scavenging in one rotor structure is accomplished by providing inlet and exhaust ports of the same circumferential length as the distance between vanes along the working surface of the cam.

My cam is stationary and is preferably fabricated in four pieces, two pairs each having the same shape. This allows easy machining, easy assembly and easy repairs. The cam is outside the vane structure. Adequate water cooling of the cam can thus be provided. The rotor structure embraces the cam on the two radially outward surfaces beyond the working surface of the cam so that a desirably long pressure leakage path is created.

My structure allows a novel lubricating system and a double vane and pressure sealing system which prevents pre-ignition and/or backfiring.

An object of my invention is to provide a simple and rugged rotary internal combustion motor.

Another object is to provide an essentially springless vane structure for such a motor.

Another object is to provide efficient scavenging in such a motor.

Another object is to provide a simple and novel cam for such a motor.

Another object is to provide a rotary motor structure that is easily oiled.

Another object is to provide a valveless, light-weight rotary internal combustion engine of good efficiency.

Other objects will become apparent upon reading the following detailed specification and upon examining the accompanying drawings, in which are set forth by way of illustration and example certain embodiments of my invention.

Figure 2:
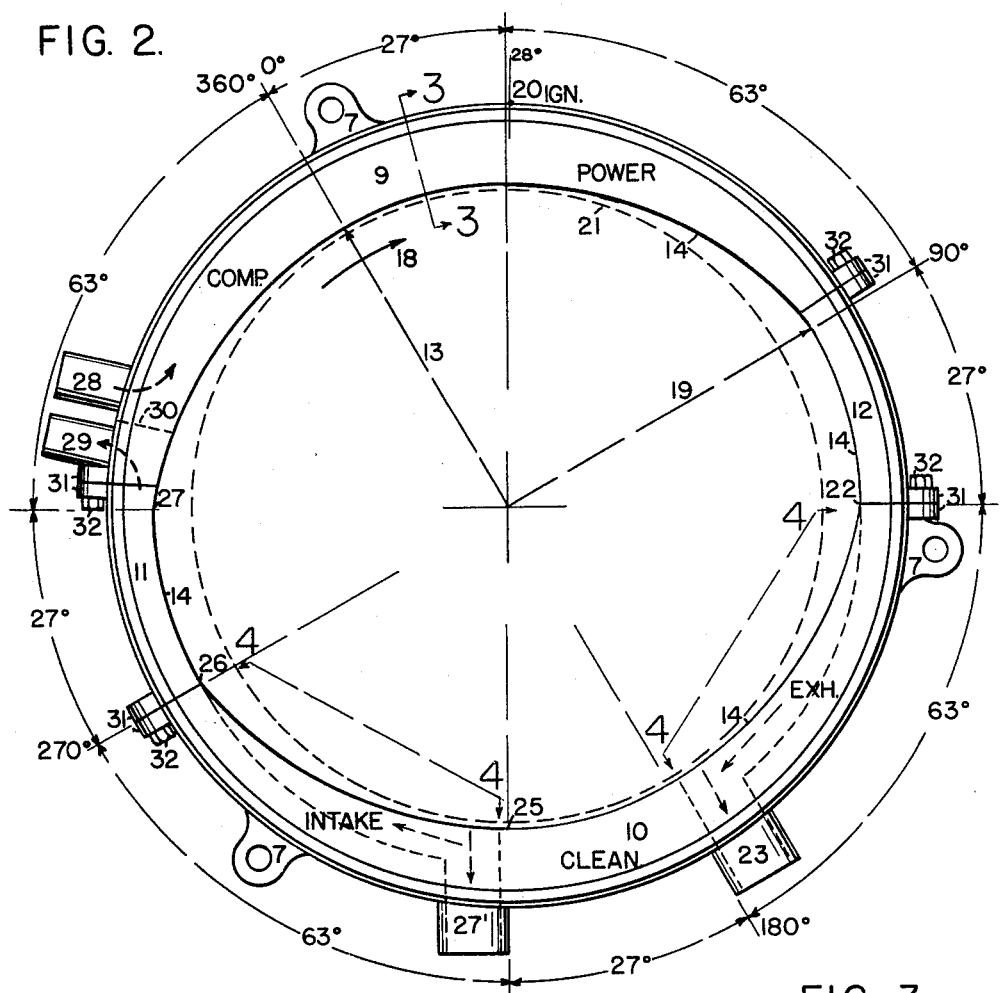
Figure 3:
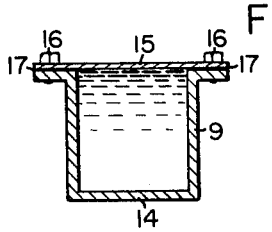
Figure 4:
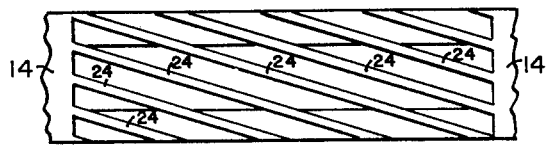
Figure 22:
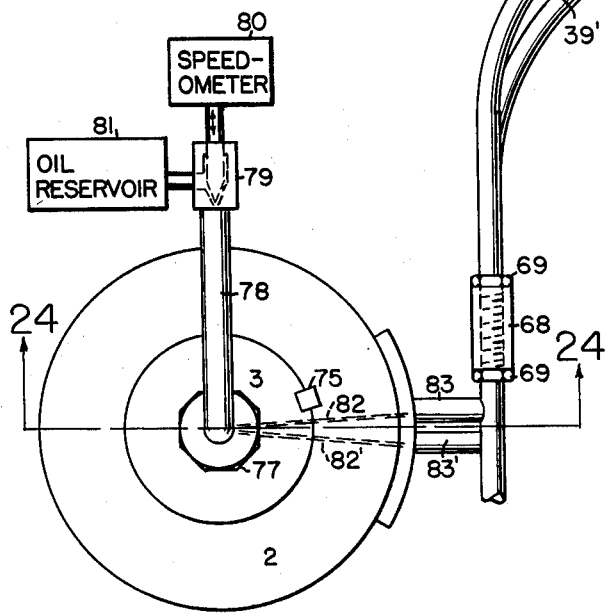
Figure 23:
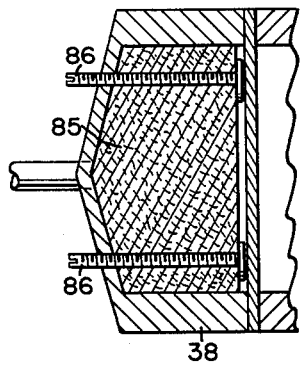
Figure 24:
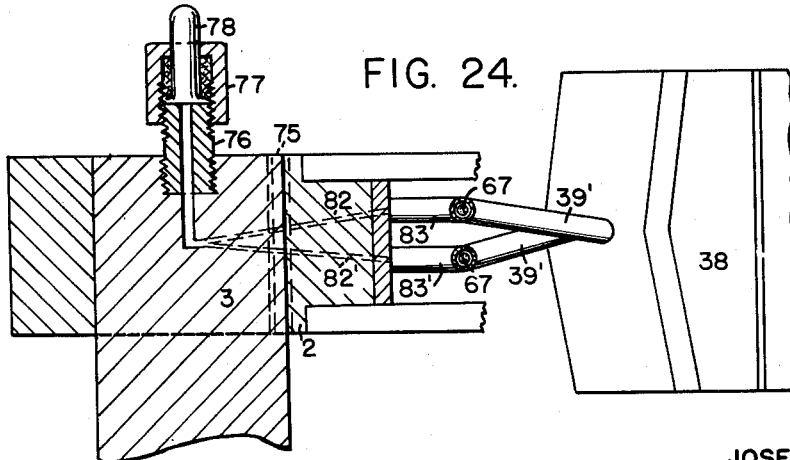
Figure 25:
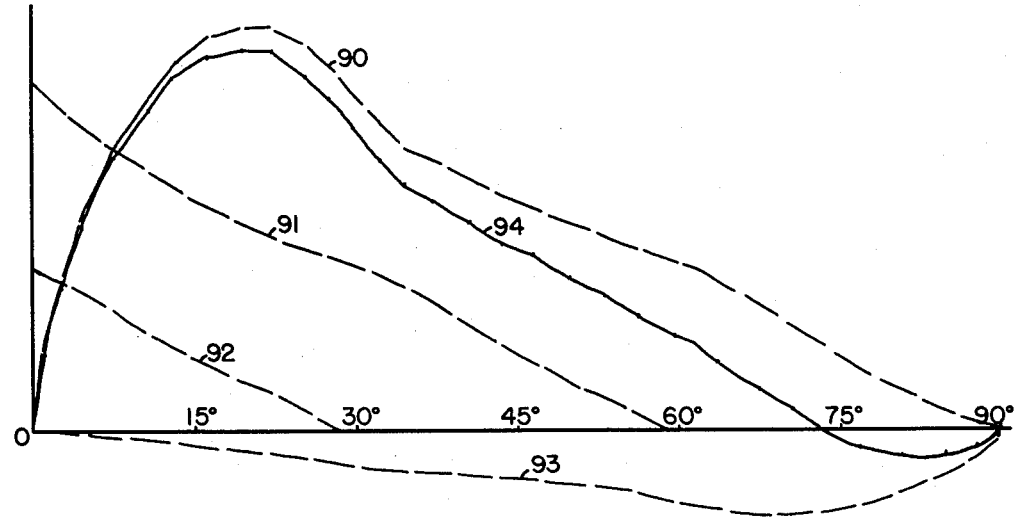
Figure 26:
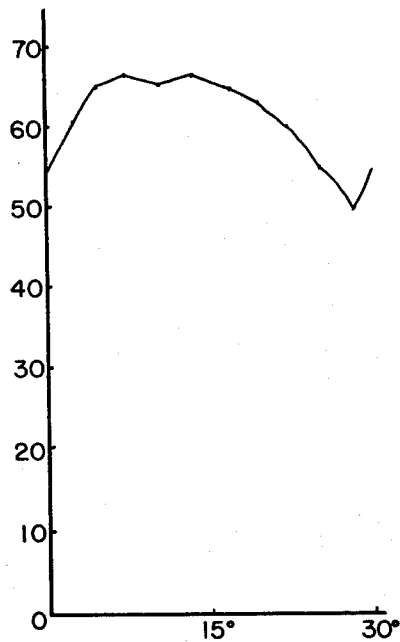
Figure 27:
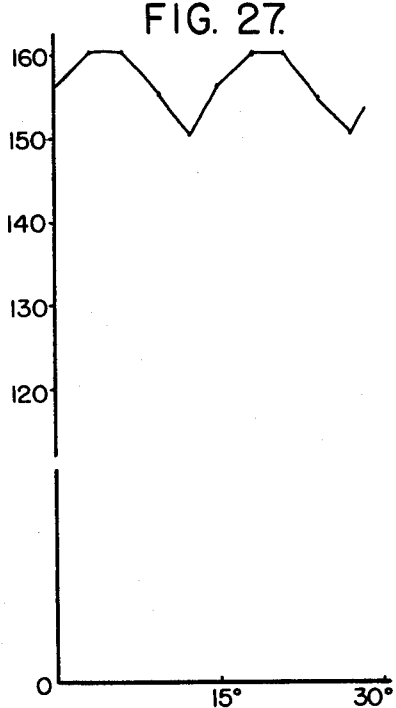
Figure 28:
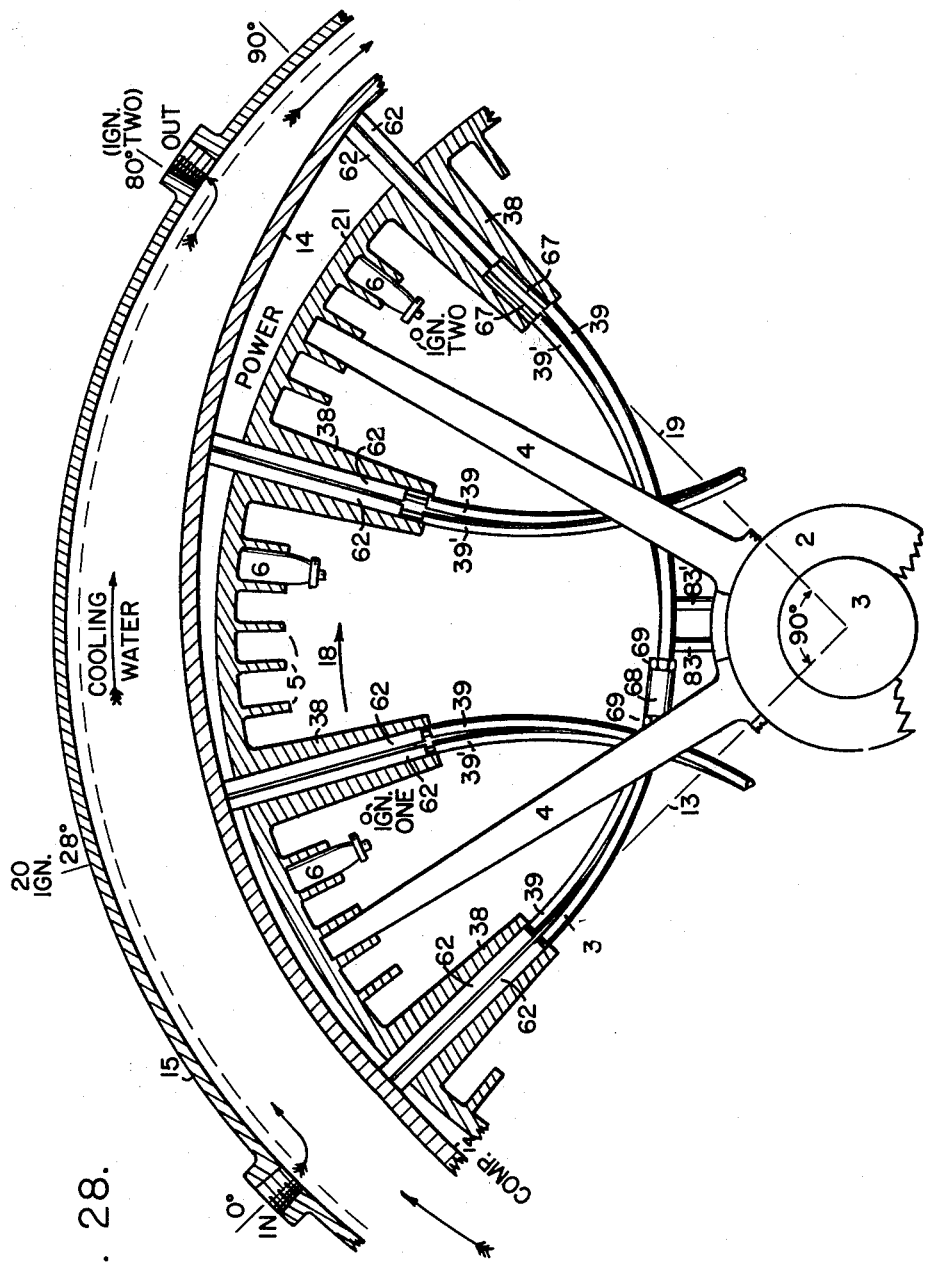
Figure 29:
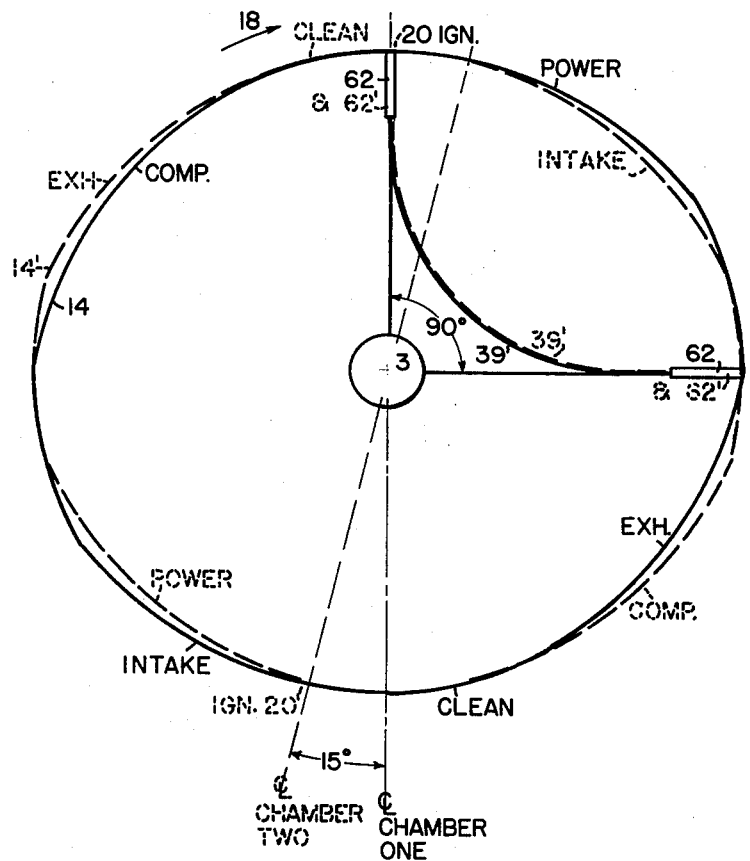

FIG. 1 shows an external plan view of my motor,
FIG. 2 shows a plan view of the stationary cam thereof,
FIG. 3 shows a vertical section of the cam taken at 3—3 in FIG. 2,
FIG. 4 shows an elevation view of exhaust or inlet ports taken from the inside of the cam as indicated at 4—4 in FIG. 2,
FIG. 5 shows an enlarged horizontal section of a portion of the rotor,
FIG. 6 shows a vertical section, transverse of the rotor rim, as 6—6 in FIG. 5,
FIG. 7 shows a vertical section, transverse of a vane slot, as 7—7 in FIG. 5,
FIG. 8 shows a vertical section, transverse of the inner circumferential portion of a vane slot, as at 8—8 in FIG. 5,
FIG. 9 shows a vertical section along a vane slot, as at 9—9 in FIG. 5,
FIG. 10 shows a horizontal plan view of a pressure seal A, for a vane,
FIG. 11 shows a vertical section transverse of pressure seal A, at 11—11 in FIG. 10,
FIG. 12 shows a vertical section transverse of pressure seal A, at 12—12 in FIG. 10,
FIG. 13 shows an elevation view of pressure seal B,
FIG. 14 shows a section transverse of pressure seal B, at 14—14 in FIG. 13,
FIG. 15 shows a section transverse of pressure seal B, at 15—15 in FIG. 13,
FIG. 16 shows an elevation view of pressure seal C (which fits into pressure seal B),
FIG. 17 shows a section transverse of pressure seal C, at 17—17 in FIG. 16,
FIG. 18 shows an elevation view of a vane (blade) assembly,
FIG. 19 shows a section thereof, at 19—19 in FIG. 18, two adjacent vanes being shown,
FIG. 20 shows an end elevation view of one vane of FIG. 19,
FIG. 21 shows a section of one vane, at 21—21 in FIG. 18,
FIG. 22 shows the oiling detail for one vane, in plan,
FIG. 23 shows a longitudinal section of the bottom of a vane cavity, at 23—23 in FIG. 22,
FIG. 24 shows an elevation view, partly in section, of the oiling detail for one vane, taken at 24—24 in FIG. 22,
FIG. 25 shows pressure and power vs. rotation curves for related working volumes in my motor,
FIG. 26 shows a total power vs. rotation curve for the same,
FIG. 27 shows a power vs. rotation curve for two such motors connected in an offset position circumferentially,
FIG. 28 shows an enlarged sectional plan view of a representative quadrant of my motor, indicating the structural relation and cooperation of the principal elements thereof, and
FIG. 29 shows how I prefer to couple two motors upon one shaft to provide the curve of FIG. 27.

In FIG. 1 numeral 1 indicates the top side plate of the rotor of my motor. A bearing boss 2 that journals main shaft 3 is fastened to the plate 1 by spokes 4. Around the periphery of the plate are numerous cooling and stiffening fins 5. A preferred embodiment has twelve vanes or blades, giving twelve "cylinders," or working volumes. My motor may have any number of vanes beginning at eight which are divisible by four; thus 8, 12, 16, 20, etc. These numbers arise from the necessity to produce a four cycle internal combustion arrangement, which is the cycle of my device.

Accordingly, twelve spark-plugs 6 are shown in FIG. 1. Three or more projecting bosses 7 are also shown and these are part of the stationary cam to be later described. The bosses allow the motor to be fastened to the vehicle or other base to which it is to be attached.

The stationary cam is shown in FIG. 2. It is fabricated in four pieces; 9 and 10 of approximately 147° circumferential length and of varying radius of working surface 14, and pieces 11 and 12 of approximately 33° circumferential length and of approximately constant radius of working surface 14 at its maximum value.

The cam of FIG. 2 is for 12 vanes. The thickness of the dual vane assembly (see FIG. 19) is 3° of arc at the radius of the cam face. The compression and scavenging sections of the cam are thus 30° minus 3°, or 27°, each.

If the motor has a different number of vanes than 12, then the length of each of the compression and of the scavenging sections is given by the following:

$$L = \frac{360}{N} - Z \text{ (degrees)} \quad (1)$$

where:
L=circumferential length of section in degrees
N=number of vanes
Z=circumferential thickness of each dual blade (or vane) assembly.

For eight vanes L=42° and for sixteen vanes L=17°.

The cam pieces are cast of a suitable material, as the best grade of cast iron, and of hollow cross-section, as shown in FIG. 3. The hollow portion is enclosed by an outer strip 15. Water for cooling is caused to flow through the resulting channel. Strip 15 is fastened to the assembled cam by such means as the cap screws 16 and gasket 17 is included between parts 9 and 15 to give a water-tight joint.

Returning to FIG. 2, the cam and motor functioning is conveniently related to a particular radius 13. Revolution of the rotor and its vanes (to be described later) is clockwise, as indicated by arrow 18. Radius 19 is ninety degrees in advance of radius 13. Radius 13 is a minimum one from the center of rotation to the working surface of the cam (surface 14) and radius 19 is a maximum.

Assuming that radii 13 and 19 rotate together clockwise around the cam with the right-angle separation maintained, as radius 13 becomes longer radius 19 becomes shorter by a corresponding amount. That is, it is possible to cut the working surface 14 of the cam in this manner and I do so cut it that the sum of the two radii is a constant. This allows me to substantially rigidly interconnect radially reciprocable vanes to accomplish pressure-tight contact between the working surface of the cam and the outer end of each pair of vanes separated by a right angle.

The operating cycle of a given "cylinder" volume is explained by noting the circumferential position thereof in relation to the stationary cam. The intersection of the radius 13 and the working surface 14 of the cam is regarded as the 0° point. From prior revolution, a compressed charge exists in the volume. As the rotor rotates clockwise with respect to the cam this volume progresses approximately 27°, at which point the sparkplug 6 is opposite ignition point 20. At the ignition point a potential is maintained by a spark coil and a suitable known interrupter (not shown). As soon as the sparkplug arrives thereat a spark jumps to the plug and also between the points of the plug within the volume being considered. This ignites the explosive charge compressed in the narrow volume indicated by the radial space between dotted circle 21 and the working surface 14 of the cam. The dotted circle indicates the outer radius (a constant) of rotor 1.

Because the right-hand vane of the particular volume has at the time of the explosion a somewhat greater area exposed to the volume than the left-hand vane of the same volume, the rotor is urged farther to the right; i.e., the clockwise rotation is continued. As it is continued the volume expands. The area of the right-hand vane is always greater than that of the left-hand. This situation continues for approximately 62° of rotation from the firing point. (I prefer that the firing point actually be 1° to the right of the vertical; i.e., at 28° from radius 13.) This situation continues with respect to the expansion of the volume for 27° farther than the 62°, but for the latter 27° the area of the right-hand blade remains constant.

This brings the power cycle to an end, 117° from the initial radius 13, at point 22 (in FIG. 2). The exhaust phase then starts and continues for 63°. The working surface of the cam in part 10 is largely open to the exhaust port 23. This is as shown in FIG. 4, which illustrates a face-on view looking into the exhaust volume through a skeleton cam working surface 24. The ribs that compose this skeleton surface are inclined at an angle of approximately 20° to the direction of motion of the several vanes. This causes the wear on the extremities of the vanes in contact with the working surface of the cam to be uniform across the widths of the vanes. This prevents ridges or grooves from being worn in the vanes, which would result in a loss of compression after the motor had been in service for a considerable period of time.

From point 22 to exhaust port 23 it will be noted that the volume between the working surface of the cam and the outer surface 21 of the (dotted) rotor decreases. This forces out the products of combustion. This process continues at a reduced rate for the next 27°. At the left side of exhaust port 23 the point of interest has traveled a half revolution since the initial 0° point.

At point 25 a new epoch starts. From that point, for the next 63° to point 26, an inlet port is located. The port proper, 27', is located at the start of this epoch. This leads from a carburetor of known type, and since known, has not been illustrated. The inlet port on the working surface of the cam has ribs in exactly the same manner as those, 24, shown in FIG. 4 for the exhaust port.

From point 26, at 270° from the starting point of 0°, to point 27, at 297°, the intake function concludes. Starting at point 25 the volume between the vanes considered has increased from a minimum value to a maximum value at point 27. Accordingly, a full fresh charge of explosive mixture has been drawn in.

From point 27 back to the 0° point at radius 13, the new charge is compressed by the radius of the working surface of the cam decreasing. It will be noted that the compression process continues essentially until the ignition point 20 is reached. The decrease of radius of the cam has ceased at the 0° point but since the volume has a circumferential length of 27° all parts of the volume have not decreased to a minimum until the distance between 0° and point 20 has largely been traversed by the point of interest within the volume.

Water cooling connection 28 is provided for water inlet at the area where compression of the charge starts. The water flows around the cam 9, 12, 10, 11 in a clockwise direction through the central cavity that has been described. It cools the compression portion to retain as low a temperature of the working substance as possible prior to ignition. It continues to the area beyond the ignition point. This area is under constant fire when the engine is operating and the function of the water here is to retain the cam at a temperature below that which would cause structural deformation.

Water outlet 29 is located adjacent to the water inlet but because of inner baffle 30 the water must travel all the way around the cam as has been indicated. Because of the shape of the cam it will be noted that from 0° to about 80°, where the heating is greatest, the cross-section of water cooling is also greatest. While the flow is limited by the narrower sections elsewhere for the single set of water connections shown it will be realized that an additional pair of water connections can be located at the 0° and the 80° points to force through additional cooling water, as shown at these points in FIG. 28. Furthermore, since the working surface of my cam is the inner surface and the outer surface thereof is not encumbered the outer surface may be extended outward as far as may be desired in order that a large water space be provided at the areas of greatest heating. This means that the sides of cam 9 as shown in FIG. 3 are extended vertically in the fabrication of this casting.

It would be usual that the water cooling system would be a closed one, with radiator and water pump. Since these instrumentalities are known they have not been illustrated.

The cam sections 9, 12, 10 and 11 are joined together structurally by lips 31 and cap screws 32 at the outer circumference of the cam and also by equivalent means near the working surface 14 and within the water cooling compartment. The latter means are not shown but are fully understood by those skilled in the art.

The basic structural aspects of rotor 1 have been described. Passing to the details, twelve vane housings 38 are cast as part of the rim structure of the rotor. These are machined internally to provide a proper sliding fit for the several dual vane assemblies. Two vanes are enclosed in each housing, as will be detailed later. Accordingly, two cable tubings 39 and 39' run from each housing to another housing 90° away circumferentially around the rotor.

FIG. 5 shows a sectional detail of one vane housing 38 and a "cycle" of construction adjacent thereto. A lateral surface 37 is shown, which encloses the cam on one side and thus forms the working volume when taken in combination with another such surface oppositely disposed but not shown in FIG. 5 because of the sectional nature of that figure. The fins 5 have previously been described. A boss 40 has pipe threads and receives the spark plugs 6 shown in FIG. 1.

FIG. 6 shows a section looking to the left in FIG. 5. It further illustrates the shape of fins 5 and also the detail of an outer pressure seal 41, of metallic packing. The essential portions of stationary cam 9, having working surface 14, is shown dotted to indicate how the seal operates. It is located between the revolving rotor 1 and stationary cam 9. In addition to this, at third points around the circumference of the rotor, hardened adjusting screws 42 bear against opposite sides of the cam. These are somewhat auxiliary to the packing 41 but serve to accurately position the rotor in relation to the stator and to allow a fine adjustment of this relation. Locknuts 43 secure this adjustment.

In the vane housing 38 proper the construction is shown by a number of sectional views at different planes. FIG. 7 is a section of the housing within the working volume of the motor. The slots 44 on each side accommodate extensions on each of the two vanes that are housed in each housing. The adjacent slits have to do with pressure sealing and will be discussed later.

FIG. 8 shows the same sections, but farther down; i.e., farther toward the center of rotation. The differing slots 45 accommodate pressure sealing as before.

FIG. 9 shows a section looking circumferentially, as shown by 9—9 in both FIGS. 5 and 7. Groove 59' receives insert seal 59 to be later described. Lip 45' is that forward chamfered portion of slot 45 shown in FIG. 7.

FIGS. 10, 13, 16 and the sectional views which relate to these figures illustrate the seals that I employ adjacent to the vanes per se. These are the equivalent of piston rings in the conventional reciprocating engine.

FIG. 10 shows a channel type enclosure 47, seal A, for the edges of the vanes. The top of this channel as shown in FIG. 10 is in the working volume. The bottom extends radially inward to the full extent of the blade housing 38, in each case. The circumferential portion at the top of FIG. 10 extends 15° each side of the vertical portion. At the circumferential ends lap joints 54 are provided.

FIG. 11 shows the channel shape of seal A, and is taken at a representative middle location as shown in FIG. 10 at "11—11."

FIG. 12 shows the section at the lower and inward tip of the seal. It is seen that this consists of only three probes, 48, 49, 50. These each have oil grooves in them on the outer surfaces; i.e., grooves 51, 52, 53.

Besides acting as a pressure seal around the vane, seal A provides lubrication to the vane and the vane-housing assembly. To accomplish this function the probes dip into an oil-soaked packing to be later described and by means of the grooves shown a proper amount of lubricant is conveyed to the sliding structures. Centrifugal force supplies the pressure to produce the flow. The depth and cross-section of the grooves are adjusted in prototype manufacture to provide sufficient but not an excess of oil. These paths are the source of oil which is spread over the working surface 14 of the stationary cam upon each passage of a vane thereover.

A pair of seal-adjusting screws 46 are oppositely threaded in vane housing 38 as shown in FIG. 8. These adjust the pressure of channel seal A (47, FIGS. 10 and 11) against cam 9 (FIG. 3). A second pair of screws 46 is located above the pair shown in FIG. 8, as can be seen in FIG. 5. Further, two more pairs of screws 46 are located circumferentially, at 15° points, away from each blade housing, as shown in FIG. 5. These screws are also shown in "phantom" in FIG. 10 to indicate the positioning thereof.

FIG. 13 shows the B seal 55, which fits in the previously mentioned slots in FIG. 7. The section of the sides of this seal is shown in FIG. 14. Explosion pressure presses the lip 56 closely against the broader housing surface and so seals the vane-housing juncture. The section of the bottom of this seal is shown in FIG. 15. This is of slightly different shape but lip 56 is still present. The pressure is exerted in the direction shown by the arrow 57.

FIG. 16 shows an insert seal C, 59. This has the angle cross-section shown in FIG. 17. This seal has a lap joint 60, of the same type as used in piston rings. This seal fits in the central slot 61 (FIGS. 13, 14, 15) of seal B. A compound seal is thus obtained which gives excellent sealing action.

While I have provided proper means for sealing it is to be noted that leakage from one working volume to an adjacent one does not represent a total loss, as does corresponding leakage past the piston rings in a reciprocating engine, which leakage passes into the crankcase and does no useful work.

FIG. 18 shows an elevation view of a vane assembly by itself. One vane per se is shown at 62. An extension 63, extending all around the vane, fits into grooves 44 in FIGS. 7 and 8, and so provides a smoothly slidable mechanical assembly.

FIG. 20 shows a top view of one vane.

FIG. 21 shows a section of one vane at the lower part thereof, as indicated by "21—21" in FIG. 18. A rectangular hole 64 is seen. In this hole, as shown in FIG. 18, a sub-vane 65 is located. This is a sliding fit in hole 64. At the top of the sub-vane a stiff and rugged S spring 66 is located in a chamber partly cut out of the vane and partly out of the sub-vane. The function of this spring is to flex the few thousandths of an inch that the constancy of the sum of the two 90° radii 13 and 19 in FIG. 2 may vary as these wipe around the working surface of the cam in the rotation of the motor rotor. These variations may occur because of manufacturing imperfections or because of subsequent wear of cam surface 14 in an uneven manner.

A stout multiple-strand wire 67 is rigidly fastened into the bottom of sub-vane 65 and runs to a companion sub-vane 90° circumferentially away into which it is also rigidly fastened.

In each of the cable housings 39 or 39' a threaded "vane adjuster" 68 is provided. These are shown in FIGS. 1 and 22. The housings are cut in their run between 90° apart vanes and separated sufficiently so that there is a gap between the two ends of the housing inside of each adjuster 68. When the latter is turned the ends of the housing are brought together or moved apart depending upon which way the adjuster is turned. The cable 67 is of constant length. However, if the path thereof through the housing is made longer by lengthening the housing the far ends of the two attached vanes will be farther away from the working surface 14 of the cam, and vice versa. In this way I am able to adjust an internal element by manipulation of an external one. By this means the fit of the vanes to the cam are originally exactly adjusted and are subsequently readjusted as necessary during the life of the machine. The adjustment is locked by lock nuts 69, one at each end of each adjuster 68.

FIG. 19 shows how two vanes are located adjacent one to the other to form one partition between two working volumes. I employ this arrangement to reduce leakage to a minimum, prevent pre-ignition and also back-firing. The several parts of each of the assemblies have been previously described and will be noted. In addition, a metallic packing 70 is located at the top of the dual vanes 62, 62. This packing may contain carbon. It bears upon the working surface 14 of the cam.

Oil grooves 71 (FIG. 20) and the space of the order of twenty thousandths of an inch (0.020″) between the two vanes allows enough oil to flow outwardly (up in FIG. 19) to saturate packing 70 at all times. This gives a desirable lubrication to the surface of the cam so that at no time does a particular vane pair pass over a dry cam surface. This situation is critical near the ignition point where there is always fire, but in this event each blade lubricates as it goes.

FIG. 22 shows further oiling details. In this plan view, hub 2 is keyed on shaft 3 by key 75. Referring also to FIG. 24, threaded extension 76 is located at one end of main shaft 3. It has a packing gland 77 and a stationary tube 78. At the extremity of the tube is located needle valve 79. The opening of this needle valve is controlled by coupling to a speedometer or r.p.m. indicating mechanism 80. The intake to the needle valve is connected to an oil reservoir 81. The speedometer mechanism is connected to the motor shaft by details not shown so as to produce a displacement of the needle valve in the opening sense corresponding to the speed of rotation of my motor. Thus, a high speed opens the needle valve and allows more oil from the reservoir to enter the duct system in the engine, and vice versa.

Having passed the needle valve, the oil passes through tube 78, extension 76, passages 82 and 82′, tubes 83 and 83′ and finally to tubings 39 and 39′ which enclose cables 67. From this point the path of the oil to and through the vanes to the working portion of the motor has been already traced.

FIG. 23 shows an enlarged view of the bottom of a vane housing 38. This is filled with a metallic packing 85, such as 200 mesh copper screen or a wick packing. It saturates with oil and feeds the probes 48, 49, 50, which are the extensions of seal 47. Adjusting screws 86 hold the packing in place. When these are adjusted at the accessible threaded (left) end the packing density is altered. A greater density does not allow as much oil to come through, and vice versa.

In FIG. 28 the structural relation and the cooperation of elements of a representative quadrant of the motor is shown.

The general flow of cooling water is shown by the tailed arrows and arises from the main input and discharge orifices 28 and 29. The auxiliary cooling orifices previously mentioned are shown at the 0° and the 80° points along outer strip 15.

The left-hand pair of blades 62 are minimally extended against cam face 14, while the right-hand pair of blades are extended a maximum amount. These two pairs of blades are cross-connected together by one cable 67 for each pair. One such cable is sheathed indeformable housing 39 and the other in housing 39′.

A principal ignition point 20 is located at 28°, as is also shown in FIG. 2. The ignition is thus timed, but actually occurs because of a spark plug 6 passing stationary electrode "Ign. One" as shown in FIG. 28. The motion of the rotor is clockwise, as shown by arcuate arrow 18 in both FIGS. 2 and 28. In the latter figure the spark plug 6 that is shown adjacent to the Ign. One electrode is just about to be energized.

An additional means to ignite each charge of the working substance a second time is embodied in the stationary electrode "Ign. Two," which is located at approximately the 80° point in FIG. 28. In this figure that plug 6 that is associated with the right hand (largely expanded) volume of working substance has just passed the Ign. Two electrode. The charge is thus being completely burned to insure full utilization thereof and to prevent any unburned charge being exhausted to the atmosphere.

It is believed evident that my motor is so constructed as to only have relatively few sturdy parts, yet to have auxiliary seals, an absence of springs, a cam contour, a vane relation and a comprehensive yet integral oiling system so that it comprises an effective, adjustable and long life structure.

While my motor may be constructed in any size, the specifications of a practical embodiment are here given to indicate its capabilities.

The radius 13 of the cam working surface 14 is 10″ and radius 19 is 11″. There are twelve working volumes; i.e., twelve vanes. It will be understood that the axial length of the motor may be many inches, but for one inch the displacement is 5.511 cubic inches. The compression ratio is 1 to 8.3 and the pressure at firing is 550 pounds per square inch. The horsepower at 1,000 revolutions per minute is 23.5; at 3,000 r.p.m. it is 70.5. For an axial width of two inches these powers would be doubled, and so on.

FIG. 25 shows the foot pounds per inch power vs. angular distance of travel for a 90° rotation of a working volume in my motor. The former is the ordinate and the latter is the abscissa. The former is the PLA expression of the known formula for horsepower:

$$HP = \frac{PLAN}{33,000} \qquad (2)$$

Curve 90 shows the variation of the PLA function for the working volume that fired at 0°; i.e., at the origin of the diagram. It will be noted that the function reaches a maximum at about 20° after firing and that it tails off rather linearly to zero at the 90° point.

Curve 91 shows this same power curve for the working volume that fired 30° before the one represented by curve 90. Similarly, curve 92 shows the power remaining of the working volume that fired 60° before the one represented by curve 90.

Curve 93 on FIG. 25 is the power function absorbed by the compression of the working substance in the working volume next to fire in the motor. Accordingly, the net power contribution of the working volume we are considering is given by curve 94, which curve is the difference between curves 90 and 93. Similar curves exist for the other working volumes adjacent but these have been omitted for clarity.

The force tending to turn the rotor of my motor at any instant is the sum of the three curves 90, 91, 92, less the compression curve in each instance. This relation is given in FIG. 26. This is for one motor mechanism and for a rotation of shaft 3 of 30° with the twelve blade embodiment. After 30° the curve repeats itself. It has a maximum value of 66.2 units and a minimum value of 49.6. The average value, determined as the equality of area under the curve that lies above and below this value, is 61.2. This variation of power is much less than occurs in the conventional reciprocating internal combustion engine.

It is, of course, easy and convenient to attach two of my rotary motors to a given shaft 3. This increases the total power obtained and when the motors are staggered circumferentially the power obtained is more smoothly delivered.

In FIG. 27 the power vs. angular rotation relation for two motors specified above is given. The ignition points and the cams have been staggered by 15°; i.e., half way between each other on the repeating 30° arc. This power has a maximum of 161.5 and a minimum of 156.6. The average is 156.6 and the total variation only 7.6%.

It will be recognized that such a smooth power flow is almost that of a turbine. However, my motor has an important characteristic that the turbine lacks; it has back pressure while the turbine does not. That is, should the motor be used in an automobile the back pressure known to the usual reciprocating internal combustion engine and used for braking the vehicle is also present in my motor but is absent in the turbine.

The mechanical configuration of two motors upon a single shaft 3 is shown schematically in FIG. 29. The elements comprising one motor are shown in full lines, while the elements comprising the second motor are shown in dashed lines, including the lettering and the reference numerals.

The important aspect is that cams 14 and 14' are displaced circumferentially by half of the circumferential length of a working volume; i.e., by 15°. One motor is represented by "Chamber One" and the other by "Chamber Two."

The "Power" producing sections of the cams are necessarily displaced and preferably by a multiple of 15°. This has been shown as 180° plus 15°, to most fully enhance cooling the combined motor. The relation shown is maximized in this respect.

One of the multiple pairs of blades 62 has been shown for one motor. The corresponding pair 62' for the second motor is directly behind the pair 62. This is because cams 14 and 14' have been staggered by 15°. The blades must not be staggered, so that the epoch of the blades on one cam will always be 15° different from the epoch of the blades on the other cam.

I have described an embodiment of my invention that is suited for gasoline and equivalent fuels. The Diesel principle of operation with oil as a fuel may also be used by replacing the spark plugs with solid fuel injection nozzles known to Diesel practice. Means to meter the flow of such oil is all that is required. Alternately, oil may be continuously injected at the ignition point at 0°. This would be under such pressure that the oil atomizes to a fine mist.

In order that ignition occur because of the heat of compression the compression ratio of my motor must be raised to the usual Diesel value of the order of 16 to one. This is accomplished by reducing the radial clearance between the working surface 14 of the cam and the outer periphery of the rotor surface, since this determines the minimum volume of the working volumes. It is also desirable that the structural strength of the motor be increased with respect to those parts that are involved in the compression and explosion phases. In speaking of plan and elevation views of my motor I have predicated a horizontal position for it; i.e., lying flat like a dish on a table. With this orientation it can be housed in the wing of an airplane or placed under the floor of an automobile or truck. In some installations a bevel gear pair is provided, one such gear being attached to the main shaft 3. This allows power to be taken off in a direction parallel to the plane of the dish.

Although specific examples of sizes, shapes, proportions and capabilities have been given supra this has been only to most accurately teach a specific practical embodiment of my invention. Relatively wide departures may be taken from these data without departing from my inventive concept.

Having thus fully described my invention and the manner in which it is to be practiced, I claim:

1. In combination with a rotary internal combustion motor having a rotor with an even number of equi-angularly spaced vanes bearing outwardly upon a cam with an even number of sections of progressively different radii and means upon each said vane to seal it in close rotational fit to said cam; an even number of stiff flexible cables connecting between pairs of said vanes located at approximately right angles to each other with respect to the circumference of said cam, smoothly curved tubing surrounding each said cable, said tubing attached to said rotor to provide a path for said cable between said vanes, means upon each said tubing for adjusting the effective length of each said tubing to cause the pair of vanes connected by said cable to closely follow the said progressively different radii of said cam.

2. The combination of claim 1 including in addition a cavity containing lubricating oil adjacent to the central shaft of said motor, a passage from said cavity to each of said tubing, oil grooves in said vanes, a needle valve, a speedometer element to open said needle valve proportional to the speed of rotation of said rotor, to the end that said cables, vanes and said cam are lubricated as required by the operating speed of said motor.

3. An internal combustion engine comprising a rotor having an even number of slots, two spaced reciprocable vanes in each slot, a stationary cam, said vanes bearing upon the inner surface of said cam, said cam having a change of radius such that the sum of any two radial distances taken at approximately a right angle is a constant, means to connect vanes disposed at the same approximation to a right angle apart to provide a close fit to said vanes to said inner cam surface, metered means to oil said engine through said means to connect vanes, and exhaust and inlet ports upon said cam having means to retain said vanes in position according to the shape of said cam.

4. A rotary internal combustion motor comprising, an inner rotor having a multiple of four vane housings, a radially reciprocable vane in each slot, a stationary cam surrounding said vanes, said rotor having sides bearing upon sides of said cam, said vanes bearing upon the inner surface of said cam, said cam constructed of an even number of pieces, half of said pieces having identical changes in radius and half of said pieces having a constant radius, the recited pieces alternated to give circumferential parts of changing radius spaced by pieces of fixed radius, the change of radius of said pieces being such that the sum of any two radial distances taken at radii ninety degrees apart is a constant, connectors connecting each said vane to another vane at ninety degrees away, tubes to contain said connectors in a fixed path, means to adjust the length of the connector-tube assembly to give a close fit of the two connected vanes to said inner cam surface, oiling means adjacent said tubes, a conduit between each said tube and said oiling means, oil grooves in said vanes, packing at the extremities of each said vane, said oiling means, packing and oil grooves comprising a centrifugal oiling system for said motor, and exhaust and inlet ports upon the inner surface of said cam having ribs to retain said vanes in radial position according to the shape of said cam.

5. A rotary internal combustion motor comprising an inner rotor having twelve slots, a pair of reciprocable vanes in each slot, a stationary cam surrounding said rotor and radially beyond said vanes, sides attached to said rotor bearing upon the sides af said cam, said vanes bearing upon the inner surface of said cam, said cam constructed of four pieces, two of said pieces having identical changes in radius and two of said pieces having a common constant radius, the recited pieces alternated in position to give two circumferential pieces of changing radius spaced by two pieces of fixed radius, said pieces of fixed radius being approximately one-fourth as long circumferenitally as the other said pieces, the change in radius of said pieces being such that the sum of any two radial distances taken at radii ninety degrees apart is a constant, curved flexible connectors connecting each said vane to another vane at ninety degrees away, hollow tubes to contain said flexible connectors in a curvilinear path, means to adjust the length of said hollow tubes to provide a gas tight fit of the pairs of connected vanes to said inner cam surface, an oil reservoir adjacent to said hollow tubes at the minimum radius thereof near the center of rotation of said rotor, an opening in each said hollow tube into said reservoir, oil grooves in said vanes, metallic packing at the inner and the outer extremity of each said vane, said reservoir, hollow tubes, metallic packing and oil grooves constituting an oiling system for said motor, the flow of oil in which occurs because of centrifugal force, and exhaust and inlet ports upon the inner surface of said cam, each said port substantially one-twelfth of the full circumference in extent and having oblique ribs to retain said vanes in appropriate radial position according to the shape of said cam.

6. A rotary engine operable upon an expansive working substance comprising a cam, a rotor having at least four and a number divisible by two pairs of vanes bearing upon said cam at right angles one to the other, said cam formed to have alternate sections of fixed and of changing radius such that the sum of radii at right angles is a constant therearound, plural coplanarly related curvilinear connecting means to connect vanes at right angles, and plural adjustable means to enclose said connecting means deformably coactive with said connecting means to cause said vanes to follow said working surface.

7. A rotary motor operable upon a gaseous working substance comprising an outer cam, an inner rotor having an even number of vanes in multiples of four, each composed of plural substantially identical adjacent blades bearing upon the working surface of said cam, the working surface of said cam formed with alternate sections of fixed and of variable radii to cause the sum of any two radii at right angles to be a constant, curved flexible means to connect together blades having a right angle relation one to the other, and constraining means of adjustable length to enclose said flexible means to cause said blades to closely follow said working surface.

8. A rotary motor comprising a cam with a working surface having four sections of fixed radius, and four sections of gradually changing radius, each of said latter sections longer than one of said four sections of fixed radius, a rotor having an even number greater than four of groups of reciprocable spaced closely adjacent double blades bearing upon said working surface at right angles one to the other to form plural volumes between said cam, rotor and blades; said working surface proportioned such that the sum of the radii at right angles is a constant all around said working surface, and curvilinear means having individual adjustable constraining means; said curvilinear means fastened between each said groups of blades to maintain the same in contact with said working surface.

9. A rotary internal combustion motor comprising a peripheral cam including an even number of long sections of changing radius interspersed with an even number of short sections of constant radius, as a working surface; a circular rotor having pairs of radially reciprocable vanes bearing upon said working surface at right angles one to the other and two adjacent surfaces of said rotor bearing upon adjacent surfaces of said cam to enclose plural volumes between said cam, rotor and vanes; the variation of radius of said working surface being such that the sum of the radii at right angles is a constant at all points around said working surface, cable-like connective means fastened to each pair of vanes, and adjustable restraining means deformably coactive with said connective means to maintain each of said vanes in close contact with said working surface.

10. In combination with a rotary motor having a rotor with spaced vanes bearing upon a cam having a variable radius around the circumference thereof; curvilinear elongated elements of substantially uniform cross-section connecting between pairs of said vanes located at right angles to each other with respect to the circumference of said cam, separate curvilinear elongated means enclosing each of said elongated elements, and means to deform said elongated means to adjust the effective length of each said elongated element.

11. The combination of claim 10 which additionally includes plural means differently circumferentially disposed to energize one means to ignite the charge of working substance within any one space between adjacent vanes more than once.

12. In combination with a rotary motor having a rotor with spaced vanes upon a cam having a variable radius around the circumference thereof; elongated elements of substantially uniform cross-section connecting between pairs of said vanes located at right angles to each other with respect to the circumference of said cam, elongated means enclosing each of said elongated elements, means to deform the resulting structure to adjust the effective length of each said elongated element, an oil reservoir, means connecting said reservoir to said elongated means, and a valve responsive to a characteristic of the operation of said motor to control the flow of oil between said reservoir and said elongated means according to the lubrication requirements of the operation of said motor.

13. In combination, a rotary internal combustion motor having a rotor with an even number of equi-angularly spaced and radially reciprocable double blades, the said double blades spaced at right angles one to the other and individually connected by a flexible member of constant length, deformable means to enclose each said flexible member for the adjustment thereof; a cam, sealing elements adjacent said blades, said cam surrounding said rotor peripherally as to said blades, side plates to said rotor sealing a space between said rotor and said cam, said cam having an even number of circumferential lengths, a first two of said circumferential lengths having gradually increasing radius as a function of circumferential length, a second two of said circumferential lengths having a gradually decreasing radius as a function of circumferential length, a third two of said circumferential lengths having a constant maximum radius, and a fourth two of said circumferential lengths having a constant minimum radius, each of said circumferential lengths having a changing radius being over twice as long circumferentially as each of said circumferential lengths having a constant radius; said circumferential lengths disposed so as to increase the radius of said cam, maintain it constant at a maximum value, decrease the radius of said cam, and maintain it constant at a minimum value twice within the full circumference thereof.

14. The combination of claim 13 in which said cam is formed with an annular water-cooling chamber at a radius greater than any radii of the working surface thereof, said chamber having a maximum radial dimension circumferentially coinciding with the volume of internal combustion, and auxiliary water inlet and outlet connections circumferentially flanking said volume; and two circumferentially spaced electrical ignition means rotative with said rotor to repetitively ignite one explosive charge in each of the several spaces between said blades as these spaces pass said points.

15. In combination with an internal combustion motor having a rotor with an even number of radially reciprocable blades, each pair thereof spaced at approximately a right angle one to the other being connected by a member of constant length; a cam surrounding said rotor and said blades, said cam having only one inlet and only one exhaust port, said ports ribbed upon the cam surface, said cam having an even number of circumferential lengths, four of said circumferential lengths having a gradually unidirectionally changing radius over said circumferential length, two further circumferential lengths having constant and equal minimum radii, and two still further circumferential lengths having constant and equal maximum radii, each of said circumferential lengths of changing radius being approximately twice as long as each of said circumferential lengths of constant radius; said circumferential lengths related around the cam so that the radius of the cam increases, remains constant, decreases and again remains constant within each straight angle of circumferential length; said cam further including an annular water-cooling chamber at a radius greater than any radii of the working surface thereof, said chamber having a maximum radial dimension at the circumferential length having internal combustion, and an auxiliary water inlet connection and an auxiliary water outlet connection at the beginning and end, respectively, of the circumferential length having said internal combustion.

References Cited in the file of this patent

UNITED STATES PATENTS

| | | |
|---|---|---|
| 1,269,937 | Hutsell | June 18, 1918 |
| 1,575,860 | Monk | Mar. 9, 1926 |
| 1,577,141 | Morrison | Mar. 16, 1926 |
| 1,716,901 | Rochford | June 11, 1929 |
| 1,809,051 | Luther | June 9, 1931 |
| 1,831,243 | Hart et al. | Nov. 10, 1931 |
| 1,976,042 | Skouland | Oct. 9, 1934 |
| 2,237,591 | Dumarest | Apr. 8, 1941 |
| 2,272,635 | Davis | Feb. 10, 1942 |
| 2,470,987 | Johnson | May 24, 1949 |
| 2,492,868 | Johnson | Dec. 27, 1949 |
| 2,864,346 | Taylor | Dec. 16, 1958 |

FOREIGN PATENTS

| | | |
|---|---|---|
| 104,737 | Great Britain | Mar. 16, 1917 |
| 596,076 | Germany | Apr. 26, 1934 |
| 445,450 | Great Britain | Apr. 9, 1936 |
| 509,953 | Great Britain | July 25, 1939 |
| 883,905 | Germany | Nov. 12, 1953 |